(12) United States Patent
Scott (10) Patent No.: US 7,913,363 B2
(45) Date of Patent: Mar. 29, 2011

(54) ADJUSTABLE LEVER LOAD BINDER

(75) Inventor: Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 981 days.

(21) Appl. No.: 11/468,248

(22) Filed: Aug. 29, 2006

(65) Prior Publication Data

US 2008/0235922 A1 Oct. 2, 2008

Related U.S. Application Data

(60) Provisional application No. 60/713,860, filed on Sep. 1, 2005.

(51) Int. Cl.
*F16G 15/00* (2006.01)
(52) U.S. Cl. ...................... 24/68 CT; 24/270
(58) Field of Classification Search .............. 24/71 R, 24/71 T, 71 TD, 71 CT, 68 R, 68 CT, 270, 24/271, 272; 254/243
See application file for complete search history.

(56) References Cited

U.S. PATENT DOCUMENTS

| | | | | |
|---|---|---|---|---|
| 797,715 A | * | 8/1905 | Boyd | 254/258 |
| 1,420,460 A | * | 6/1922 | Sullivan | 403/43 |
| 1,885,128 A | * | 11/1932 | Montgomery | 24/270 |
| 2,359,492 A | * | 10/1944 | Rockwood et al. | 403/43 |
| 2,422,001 A | * | 6/1947 | Durbin | 24/270 |
| 2,462,382 A | * | 2/1949 | Gleason | 403/43 |
| 2,500,488 A | * | 3/1950 | Durbin et al. | 24/270 |
| 2,824,717 A | * | 2/1958 | Yeager | 24/270 |
| 2,947,514 A | | 8/1960 | Goss | |
| 3,271,007 A | * | 9/1966 | Ratcliff | 24/270 |
| 3,418,008 A | * | 12/1968 | Durbin | 24/270 |
| 3,591,141 A | | 7/1971 | Ratcliff | |
| 3,703,024 A | * | 11/1972 | Johnson | 24/68 CD |
| 3,974,668 A | * | 8/1976 | McWhorter | 70/14 |
| 4,238,940 A | * | 12/1980 | McWhorter | 70/14 |
| 4,280,432 A | | 7/1981 | Dessel | |
| 4,335,489 A | * | 6/1982 | Muller et al. | 24/68 CT |
| 4,423,639 A | * | 1/1984 | Grade et al. | 73/862.42 |
| 4,500,073 A | * | 2/1985 | Smith | 254/258 |
| 5,570,897 A | * | 11/1996 | Wass | 280/495 |
| 6,374,465 B1 | * | 4/2002 | Dykstra | 24/68 T |
| 6,477,747 B1 | * | 11/2002 | Flagg | 24/68 CD |
| 7,065,840 B2 | * | 6/2006 | Profit | 24/71 TD |
| 7,219,951 B2 | * | 5/2007 | Rasmussen | 296/156 |
| 7,752,924 B2 | * | 7/2010 | Kay | 73/862.391 |
| 2004/0064921 A1 | | 4/2004 | Mittleider | |

* cited by examiner

*Primary Examiner* — Daniel P Stodola
*Assistant Examiner* — Michael Lee
(74) *Attorney, Agent, or Firm* — Schwabe, Williamson & Wyatt (57) ABSTRACT

Apparatuses are disclosed where in a lever binder may include an adjuster that when manipulated adjusts the binding length of the lever binder. In various embodiments, a lever binder is disclosed including an automatic latching mechanism to help resist undesired movement of a lever from a binding position.

4 Claims, 7 Drawing Sheets

ADJUSTABLE LEVER LOAD BINDER

RELATED APPLICATION

This application claims priority to U.S. Provisional Application No. 60/713,860, entitled "ADJUSTABLE LEVER LOAD BINDER" filed on Sep. 1, 2005, which is hereby fully incorporated by reference.

TECHNICAL FIELD

Embodiments of the invention relate generally to the field of load binders and in particular to a lever load binder adapted to be adjustable and latchable.

BACKGROUND

Lever load binders, sometimes called lever binders, or load binders are known and may be used to bring together links of a chain to tighten the chain to bind a load. A lever load binder includes a binder body or, a yoke, with a first hook connected at one end. The binder body is pivotally connected to a lever or handle at a first pivot point. A second hook is connected to a linkage that is pivotally connected to the lever at a second pivot point. The second pivot point is adapted to move in an arc centered about the first pivot point as the lever is moved from an open or extended position to a binding position.

If the tension is too great as the lever is being moved to the binding position, the operator often will use an extension such as a cheater bar to provide more leverage. Attempting to move the handle to the binding position when the tension is too great can be dangerous, as the handle can slip back and hit the operator, sometimes referred to as kickback. The danger is more pronounced when trying to move the handle linkage with an extension. Further, using an extension may also put too much stress on the binder and break it and/or the chain.

If the tension is too great such that the lever cannot be moved to the binding position, or not enough to bind the load or cause the lever to remain in the binding position, the operator may have to unhook one hook from a first link in the chain and rehook it to another link in the chain. Due to the typical size of the chain links, often an inch or more, it may not be possible to hook a link that allows for proper tensioning of the chain around the load when moving to the binding position. The inability to make adjustments finer than the length or pitch of a chain link often results in the chain either being too loose or too tight. Too much tension places the operator at risk and too little tension can result in an improperly secured load. Hooking and re-hooking the binder trying to find the best possible tension wastes time slowing deliveries and increasing operating costs.

Once hooked and in the binding position, there is a danger of the lever being bumped or unbinding due to shifting loads, etc. This can result in serious problems, such as a truck losing its load on a highway. While certain load binders have attempted to include a locking feature, they have not been successful due to operating constraints, inefficiency and complexity.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

According to one or more embodiments of the invention, the following definitions may apply: The "binding length" of the lever load binder may be defined as the distance from the first hook to the second hook when in a binding position. A "link pitch" may be defined as the distance one part of a link in a chain to a corresponding part of an adjacent link. An "inter-pitch" adjustment may be defined to include an adjustment of the binding length of the load binder including adjustments less than a link pitch.

FIGS. 1a, 1b, 1c, and 1d illustrate one embodiment according to the present invention. A lever load binder may include a binder body first member 10, which may in some embodiments be a yoke or clevis, coupled to a lever 12 at a first pivot 14. A first coupling 16, such as a first hook, may be coupled to one end of the first member 10, and adapted to couple the lever binder to an item, such as a chain or load strap. A lever binder second member 18 may be coupled to the lever 12 at a second pivot 20. A second coupling 22 may be coupled to an end of the second member 18. In various embodiments, the first and second couplings may be coupled to the first and second members by one or more chain links and/or a swivel connection which may allow the couplers to rotate as needed to adjust to the item being coupled.

In one embodiment, movement of the lever 12 from an extended position (FIG. 1a) to a binding position (FIGS. 1c and 1d) may cause the second pivot 20 to arc about the first pivot 14, with the load providing resistance. When the arc of the second pivot 20 gets past a center of the first pivot point relative to the resistance, it may begin to move towards the resistance. This is sometimes referred to as over-center. In various embodiments, the lever load binder may include a stop that will prevent the second pivot from going too far past the center of the first pivot, and may be thus held in the binding position by the resistance force.

One of the dangers with lever binders is achieving the transition between pulling against the load and the load exerting a force in the opposite direction, sometimes referred to kick back. When using a lever binder where, for example, 5000 lbs of force may be exerted, the kick back can be extremely dangerous. Again, this may be compounded by the use of an extension or cheater bar.

Figure 1A:
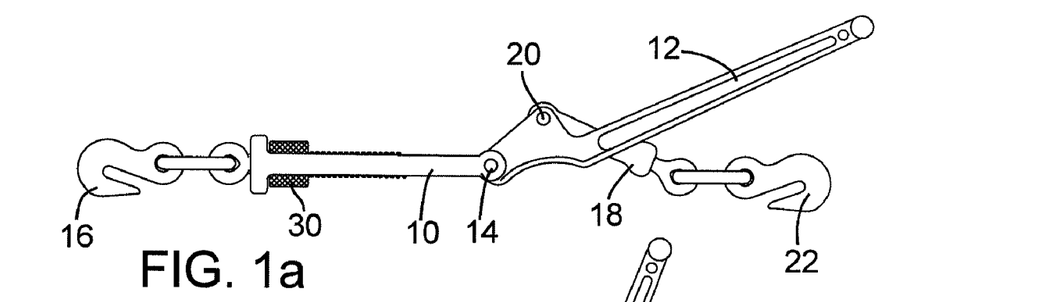
FIGS. 1a-1d illustrate side views of an adjustable lever binder in accordance with various embodiments.
Figure 1B:
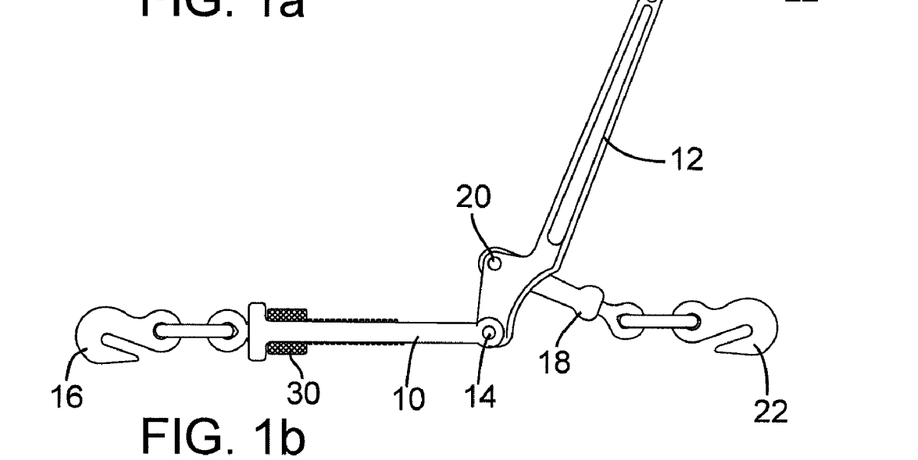
Figure 1C:
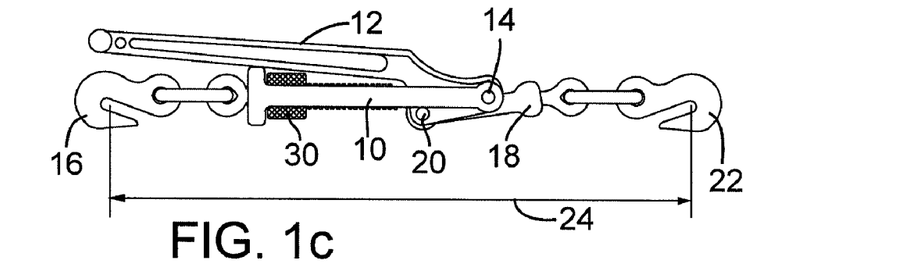
Figure 1D:
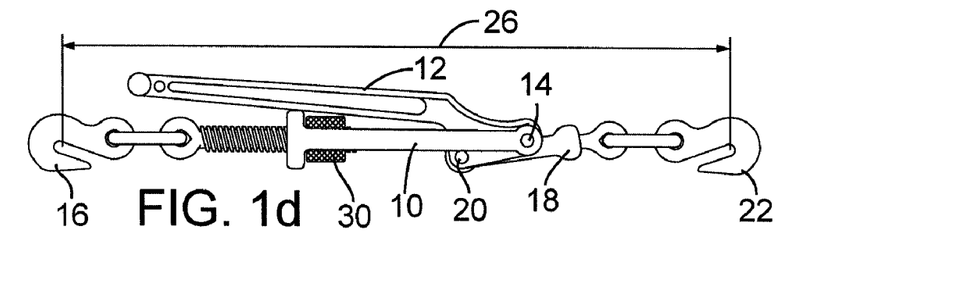
Figure 4:
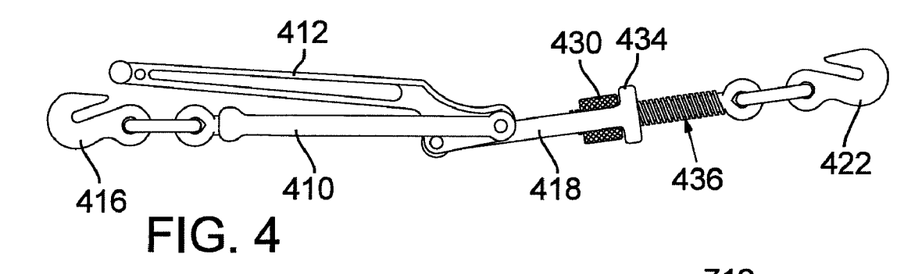
FIG. 4 illustrates a side view of an adjustable lever binder in accordance with various embodiments.

In one embodiment, an adjuster 30 may be coupled to the first member 10 and the first coupling 16, and may be adapted to adjust the binding length at, for example, inter-pitch intervals, such as illustrated by binding lengths 24 and 26 in FIGS. 1c and 1d. In various embodiments, the adjuster 30 may also be disposed between other parts of the lever load binder such as between the second coupling 22 and the second member 18 (see e.g. FIG. 4).

Figure 2A:
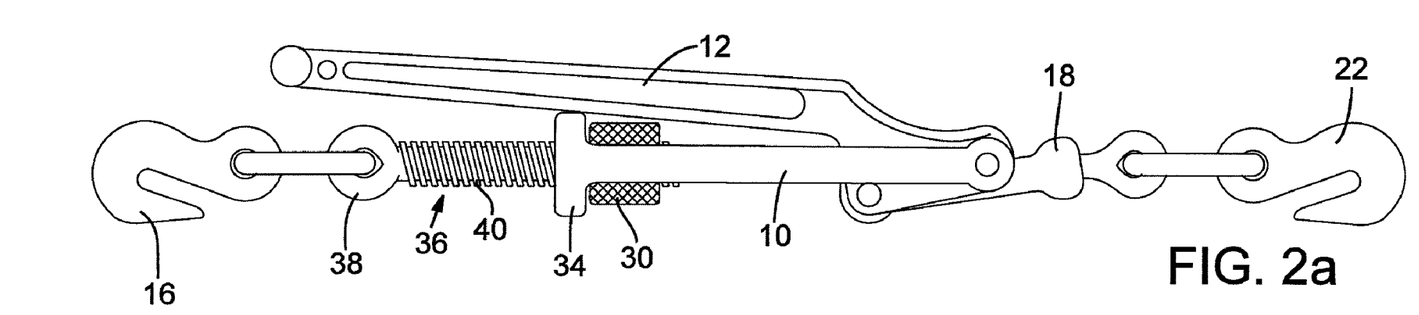
FIGS. 2a-2c illustrate side views of an adjustable lever binder and an exploded portion of an adjustable lever binder in accordance with various embodiments.
Figure 2B:
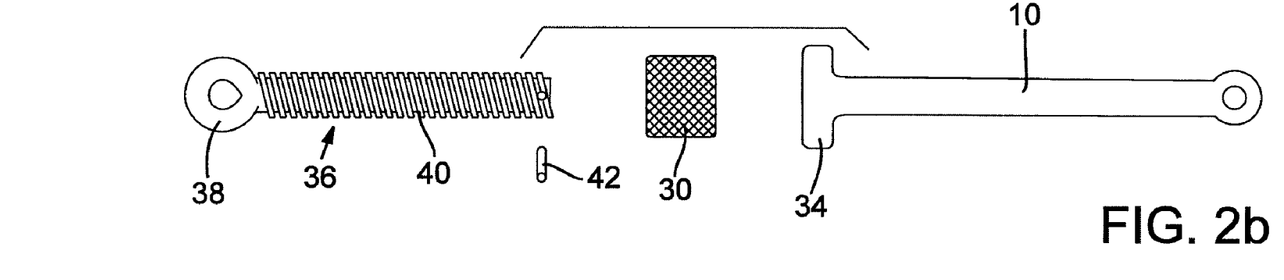
Figure 2C:
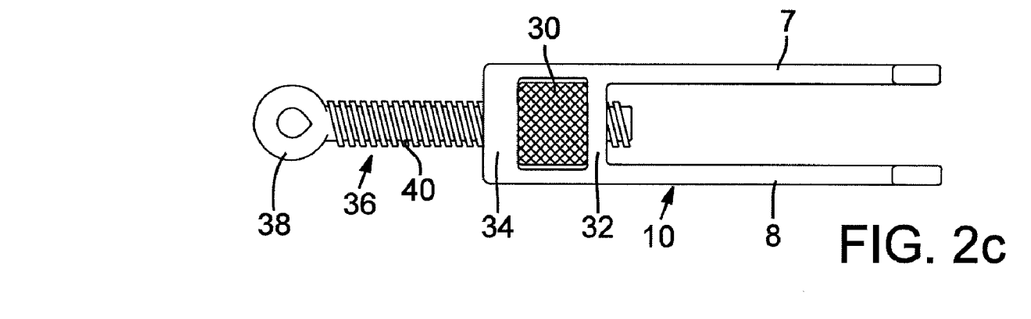

As illustrated in FIGS. 2a, 2b and 2c, in various embodiments, the adjuster 30 may be coupled to the first member 10 by being disposed between spaced apart longitudinal arms 7 and 8 of the first member 10. In various embodiments, the adjuster 30 may include a threaded inner portion, and may be, for example, a barrel connector, an adjustment nut or other threadable engagement device. In various embodiments, the first member may be a generally solid tube, having a portion removed to accommodate the adjuster. First member 10 may have an end member 34 having an aperture defined therein, and configured such that the adjuster 30 may abut the end member 34. In one embodiment, though not necessary, a second end member 32 may be axially spaced from the first end member and have an aperture defined therein (FIG. 2d). The second end member may be axially spaced in order to accommodate the length of adjuster 30.

A shaft 36 may have a first end 38 coupled to the first coupling, and a threaded second end portion 40 that may be adapted to pass through the aperture in the end member 34. Threaded second end portion 40 may threadably engage the adjuster 30, thereby coupling the first coupling 16 to the first member 10 of the lever binder.

When so coupled, the binding length of the lever binder may be adjusted by moving the adjuster 30 relative to the shaft 36, which in turn may move the shaft 36, and thus the first coupling 16 can thus affect the binding length in, for example, inter-pitch increments, thereby eliminating the need to unhook and re-hook for fine adjustments. By having the ability to and making inter-pitch adjustments not previously attainable, the amount of force needed to cause the second pivot point to go past the center of the first pivot point can be reduced or increased as required to allow the operator to select the correct amount of tension for a particular application. This not only improves the effectiveness and efficiency of the lever binder in securely binding a load, but also improves operator safety.

In various embodiments, the adjuster may include a surface feature (e.g. finish or shape) adapted to make it easier to grip, move and/or turn, for example, by a user's thumb and forefinger, or by simply moving (e.g. rolling) the adjuster with a single finger. One example of a surface finish may be a knurled surface. In other embodiments the surface may be adapted to cooperate with a tool that can help adjust the binding length. Adjusters in accordance with embodiments of the invention may thus allow for quick and easy binding length adjustment, with out having to disturb the lever binder's relation to the load, for example.

In various embodiments, a stop may be coupled to the threaded second end 40 of the shaft 36 and be adapted to help prevent the shaft 36 from extending too far and possibly disengaging the adjuster 30. In one embodiment, a roll pin 42 may be positioned within an aperture in the second end 40 of shaft 36 at a point such that the shaft 36 will not be able to be extended past the adjuster. Further, in various embodiments, the threads of the adjuster and the shaft may be sufficiently robust to withstand the tension on the load binder under load, such as blunt double lead threads or other threads that may be sufficiently deep and thick enough to withstand such forces.

In various embodiments, the adjuster may be a variety of extension permitting configurations, other than a threaded engagement. For example, a clamp may be disposed in the first member and may be adapted to clampingly engage the shaft at different positive stop points such that the shaft could move axially. Movement of the adjuster relative to the first member (e.g. squeezing ears to cause disengagement) may cause the clamping engagement to be temporarily interrupted. In another example, the shaft may have several apertures spaced along its length. A retaining pin may be selectively inserted through an aperture (thus being a movable adjuster) to extend or retract the length of the shaft with respect to the binder body.

Figure 3A:
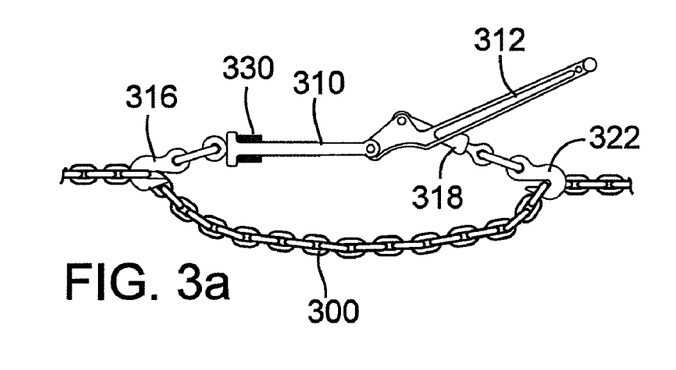
FIGS. 3a-3d illustrate side views if an adjustable lever binder and a method of adjustment in accordance with various embodiments.
Figure 3B:
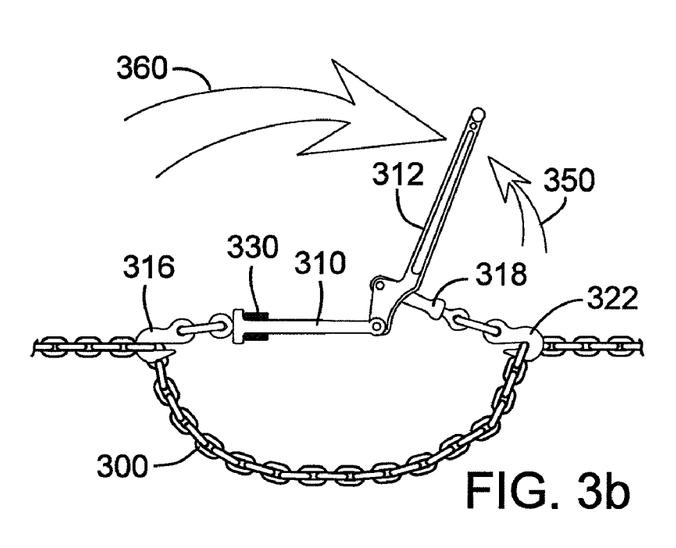
Figure 3C:
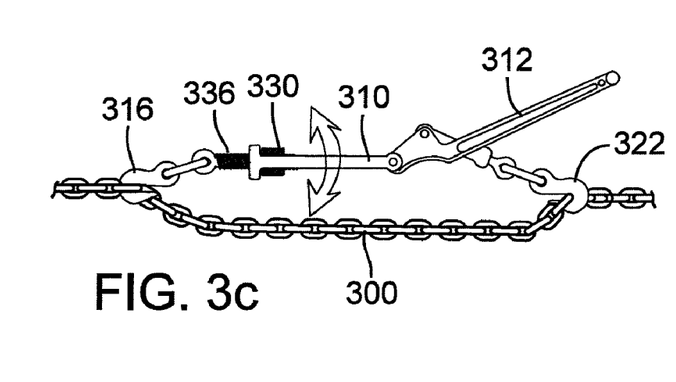
Figure 3D:
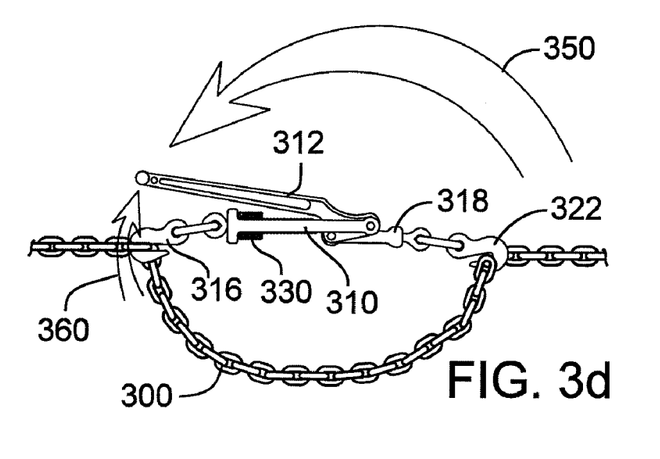

As illustrated in FIGS. 3a, 3b, 3c, and 3d, first and second hooks 316 and 322 may each be connected to different links in a chain 300. The lever 312 may be moved from an extended position (FIG. 3a) towards a binding position forcing the second pivot point to move relative to the first pivot point. If the amount of applied force 350 necessary to over come the resistance force 360 accomplish this task is too great (e.g. FIG. 3b) or too little, the adjuster 330 may be rotated to change the overall binding length (FIG. 3c). Once adjusted, the applied force 350 may be sufficient to overcome the resistance force 360 and create a sufficient binding of a load, without requiring the use of undue applied force, extensions, and the like (FIG. 3d).

In various embodiments in accordance with the present invention, a lever binder may include a latch mechanism that may be adapted to secure the lever in a binding position with respect to a first member in order to prevent inadvertent unbinding of the lever binder or movement towards an open position. In various embodiments, the latch mechanism may include a first latch piece coupled to the lever and a second latch piece coupled to the first member. In various embodiments, at least one of the latch pieces may be biased towards a latching position, such that the latch pieces automatically latch as the lever is brought into the binding position, thereby holding the lever in the biding position and help resist inadvertent unbinding. In various embodiments, a third latch piece may cooperate with the first and second latch pieces and control the latching of the first and second latch pieces.

In various embodiments, one or more of the latch pieces may be generally rigidly coupled to and/or integrated with the respective lever and/or first member. While the illustrated embodiments discussed below show an adjustable lever binder in accordance with various embodiments, the latch mechanism may be used with non adjustable lever binders as well.

FIGS. 5a-5d illustrate an example of a lever binder latch mechanism in accordance with embodiments of the present invention. Lever 512 may include a first latch piece 502 pivotally connected thereto at pivot 503. First latch piece 502 may include a first latch end 505. First member 510 may include a second latch piece 504 coupled thereto and positioned for engagement with the first latch piece 502. In one embodiment, second latch piece 504 may be rigidly coupled to first member 510. Second latch piece 504 may include a second latch end 507.

Figure 5A:
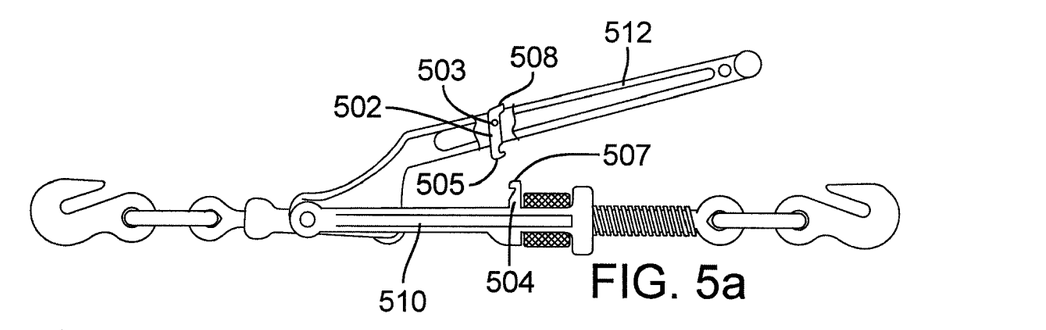
FIGS. 5a-5d illustrate side views of an adjustable lever binder in accordance with various embodiments.
Figure 5B:
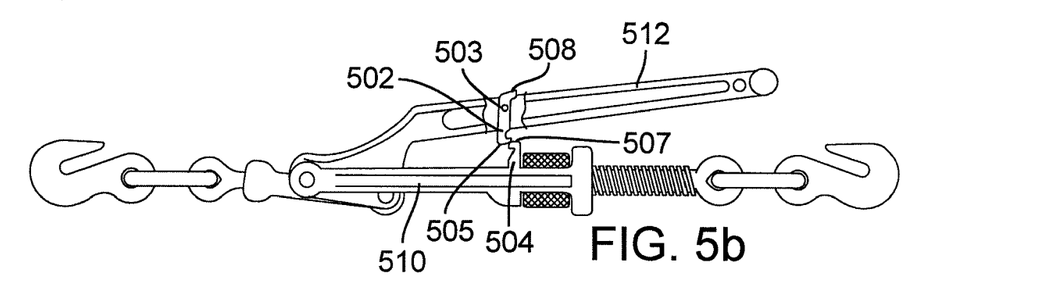
Figure 5C:
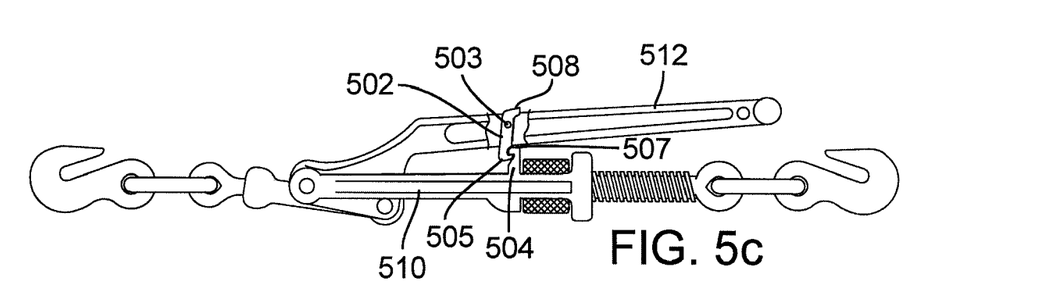

First latch end 505 and second latch end 507 may be configured to urge first latch end 505 away from second latch end 507 for a brief period as the first and second latch ends first engage each other (FIG. 5b). First latch piece 502 may be biased to resist such movement. In one embodiment, a spring may be coupled to the first latch piece at the pivot 503. As the first latch end 505 passes a certain point with respect to the second latch end 504, the force of the bias may urge the first latch piece 502 into latching engagement with the second latch piece 504 (FIG. 5c), thereby holding lever 512 in a binding position relative to first member 510.

Figure 5D:
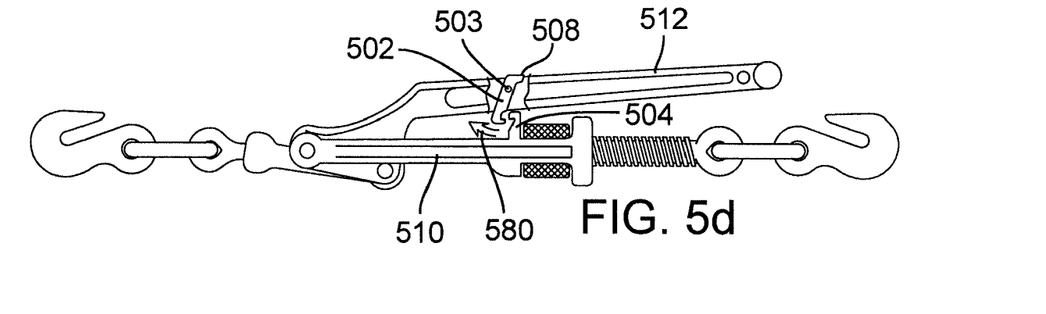

To move the lever from the binding position to the unbound position, first latch piece 502 and second latch piece 504 may be decoupled and the lever 512 moved away from first member 510. In one embodiment, first latch piece 502 may have an actuator 508 that may be actuated, for example by a user's thumb and/or finger, to over come the bias force urging the first latch piece 502 and the second latch piece 504 into latching engagement. This may cause the first latch piece 502 to pivot away from the second latch piece 504 (generally against the bias) as shown by arrow 580 and allow the lever to move towards the open position.

While in the example embodiment the first and second latch pieces are shown to be generally hook shaped, either the first and/or second latch piece may be of other configurations, such as, for example, a rod horizontally disposed within a cavity of either the lever and/or the first member.

Another example latching embodiment is illustrated in FIGS. 6a-6d. Similar to the previous example embodiment, a first latch piece 602 may be adapted to latchingly engage a second latch piece 604. Again, one or more of the latch pieces may be biased towards latching engagement and configured such that moving the lever 612 towards the biding position may cause the latch pieces to automatically latch. In order to unlatch the first and second latch pieces 602 and 604, an actuator may be coupled to the first latch piece 602 and adapted to be actuated to cause delatching. In various embodiments, the actuator may be positioned between the lever and the first member in order to further protect the actuator from inadvertent actuation as a result of being bumped, jarred, etc.

Figure 6A:
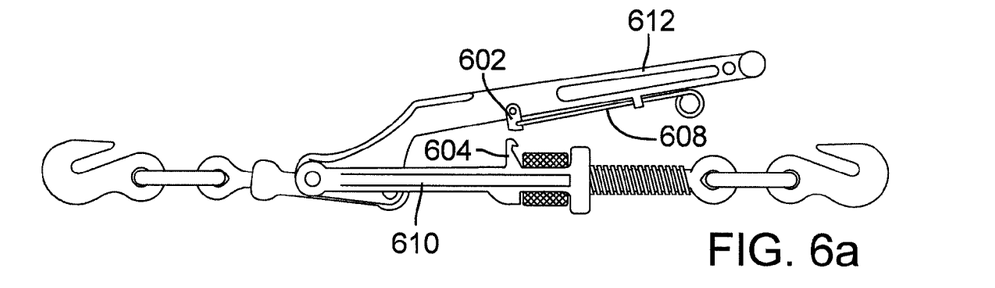
FIGS. 6a-6d illustrate side views of an adjustable lever binder in accordance with various embodiments.
Figure 6B:
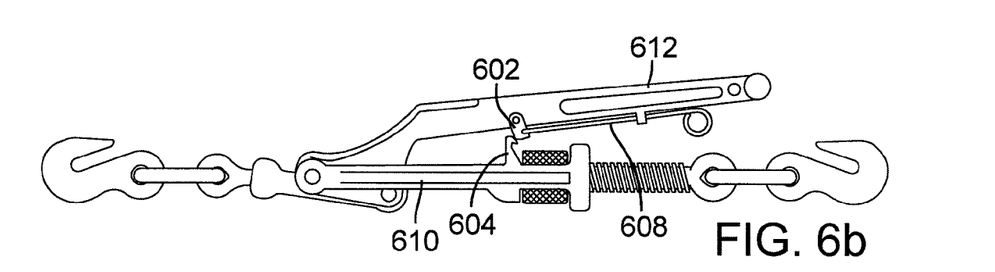
Figure 6C:
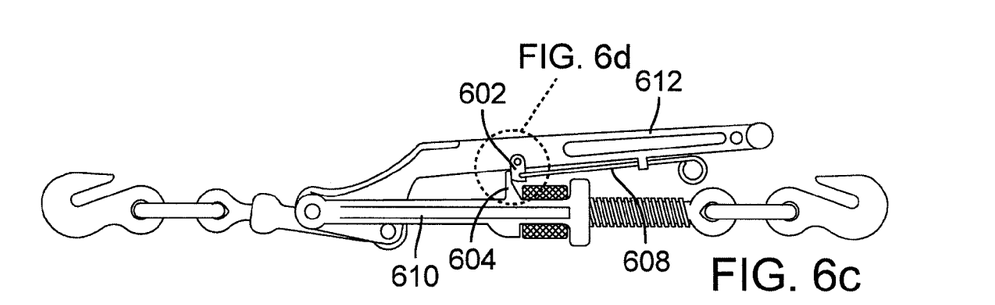
Figure 6D:
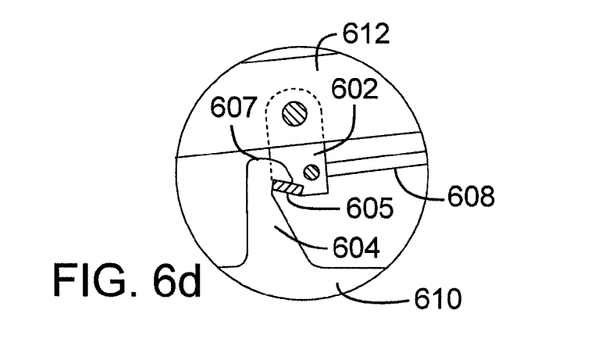

FIG. 6d illustrates an exploded view of an example latch configuration, where the first latch piece 602 is pivotally secured to the lever 612. Second latch piece includes second latch end 607 being somewhat hooked shaped such that it can hook into the first latch piece 602 at first latch end 605. Actuator 608 may be pivotally coupled to first latch piece 602, and configured to cause delatching upon actuation.

Figure 7A:
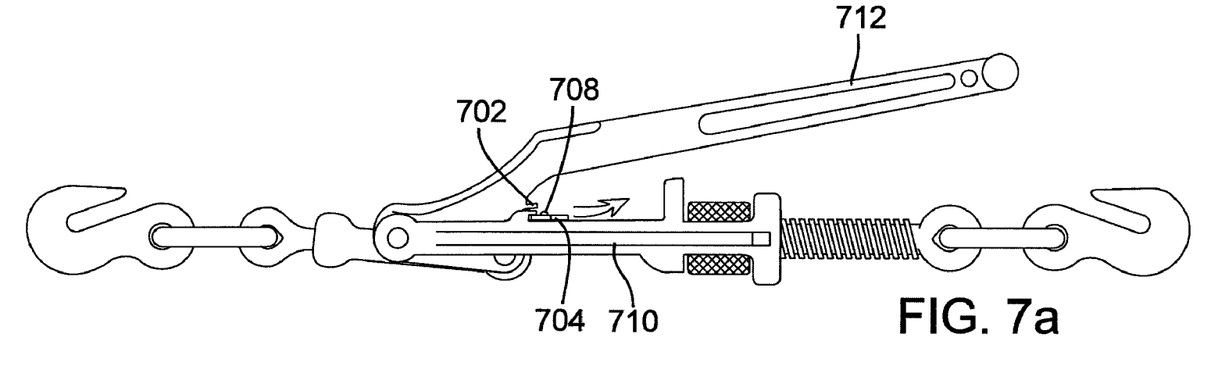
FIGS. 7a-b illustrate side views of an adjustable lever binder in accordance with various embodiments.
Figure 7B:
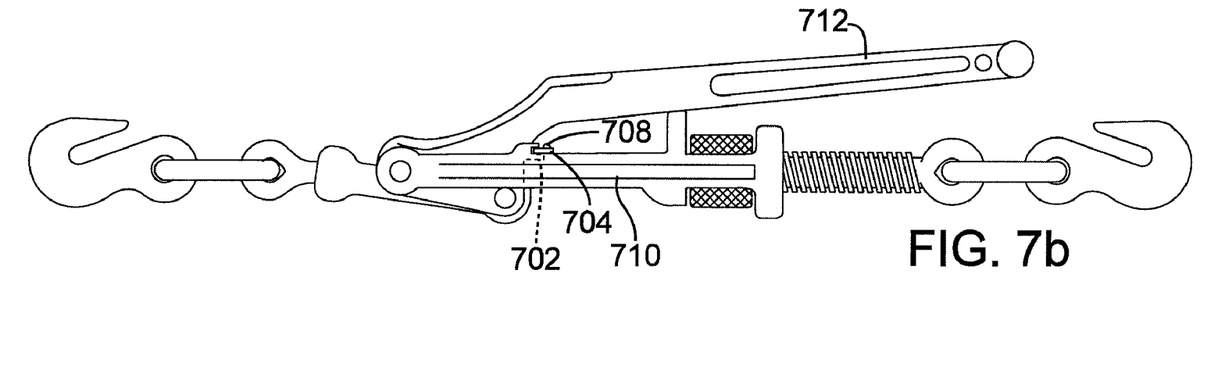

FIGS. 7a and 7b illustrate another embodiment of a lever binder in accordance with embodiments of the invention. A first latch piece 702 may be coupled to lever 712. Second latch piece 704 may be slidingly coupled to first member 710 and adapted to engage first latch end 702 to attain a latched position. Second latch end 704 may be biased such that it is urged to the latched position. Thus, as the lever 712 is brought into a biding position, the first latch piece 702 may engage the second latch piece 704 and forces the second latch piece 704 to slide generally away from first latch piece 702. As the first latch piece 702 passes far enough past the second latch piece 704, the bias forces the second latch piece 704 to slide towards the first latch piece 702, thereby creating a latching engagement.

To unlatch the first latch piece 702 from the second latch piece 704, a user may actuate an actuator 708, which in this example is a raised portion, and cause the second latch piece 704 to slide away from the first latch piece 702, thereby allowing the lever 712 to move towards an open position.

FIGS. 8a-8d illustrate another example embodiment of a lever binder latching mechanism in accordance with embodiments of the present invention, wherein a third latch piece is used to complete the latched position. Lever 812 may include a first latch piece 802, which may be substantially rigidly fixed to the lever 812. A second latch piece 804 may also be substantially rigidly fixed to the first member 810. A movable third latch piece 809 may be adapted to engage the first latch piece 802 and/or the second latch piece 804 to complete the latching operation.

Figure 8A:
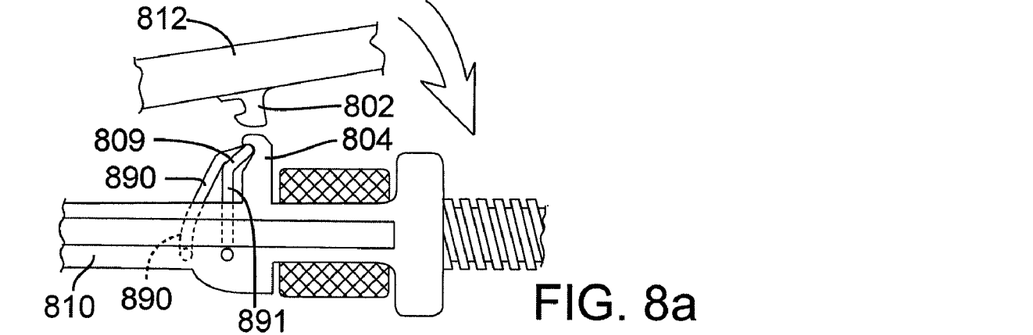
FIGS. 8a-8d illustrate side views of an adjustable lever binder in accordance with various embodiments.
Figure 8B:
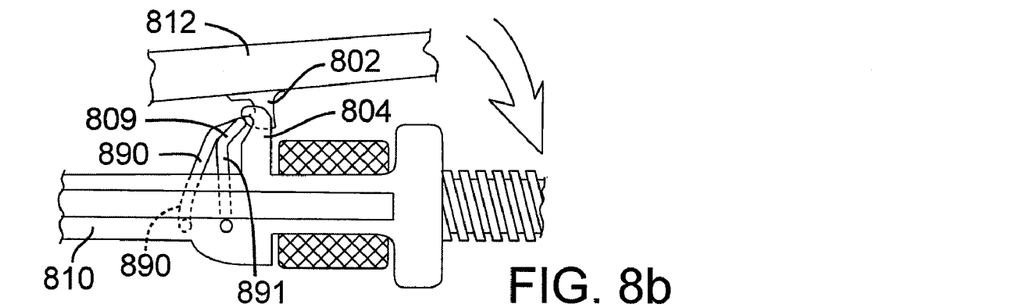
Figures 8C, 8D:
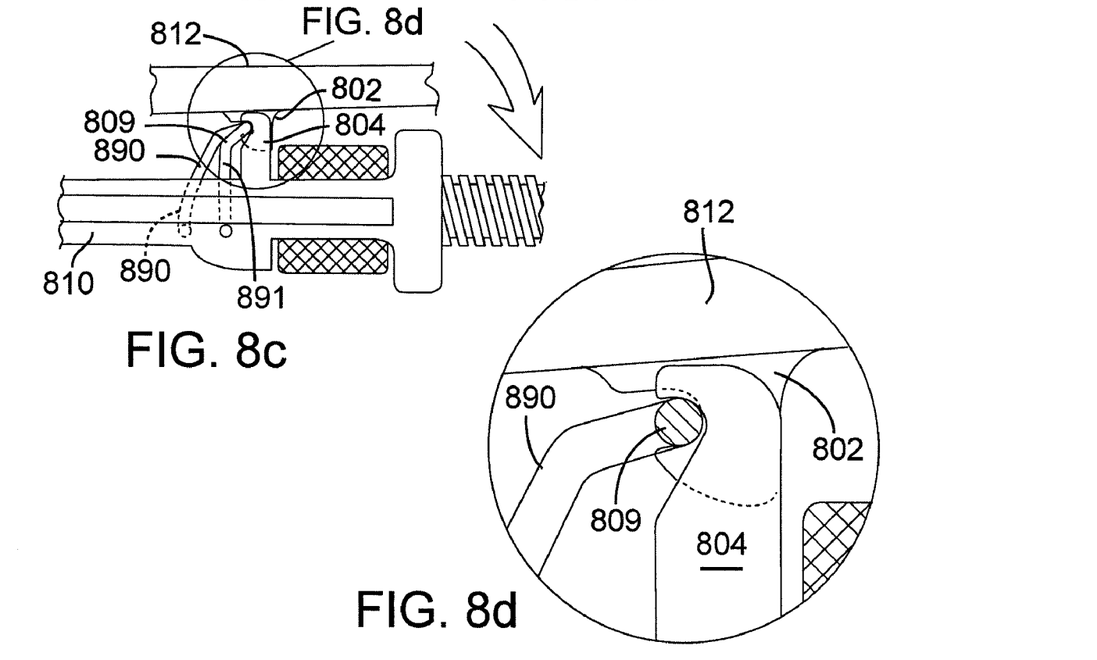

In one embodiment, third latch piece 809 may be a biased member that can be deflected by the first latch piece 802 as it is being moved into a latched position (FIG. 8b). In various embodiments, the third latch piece may be biased towards the latched position. In one embodiment, the first and second leg portions 890 and 891 of the third latch piece may be coupled to the first member 810 (or lever in other embodiments) in an off set configuration, which in turn may provide the bias force generally urging the third latch piece towards the first and second latch pieces. Once the lever moves to a certain point, the third latch member may engage the first and second latch pieces to generate the latched position.

While several embodiments have been shown of an automatic latching feature for illustration explanation purposes, different latching configurations may be used. For example, in various embodiments, a pinch pin and receiver arrangement may be used as the first and second latch pieces, such that as the lever is brought into the binding position, lever or first member carrying the receiver may cause the pinch pins to move generally away from its body, then due to a biased force, engage the receiver to attain the latched position.

In various other embodiments, the latch pieces may be movably coupled, fixedly coupled, and/or integrated with the lever and/or first member. Further the configurations of the various latch pieces shown in the illustrated embodiments may be generally reversed without departing from the scope of the invention.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A load binder for binding a load to be transported comprising:
   a lever;
   a first member pivotally coupled to the lever at a first position and a first coupling coupled to the first member;
   a second member pivotally coupled to the lever at a second position and a second coupling coupled to the second member;
   said first and second positions providing pivoting of said lever to alternatively elongate and shorten the distance between said couplings thereby defining a binding length, and in the shortened position providing over center resistance to movement toward the elongate position;
   one of said members in the shape of a clevis having an end portion and spaced apart arms to thereby permit pivoting of a portion of said lever between the spaced apart arms to provide the over center resistance to movement toward the elongate position, and
   said end portion defining an aperture through which a threaded shaft portion of the respective coupling thereto slidably protrudes between the spaced apart arms and including a threaded adjuster threadably and adjustably engaging the protruded threaded shaft portion to prevent withdrawal of the threaded shaft portion back through the aperture, which adjuster is rotatably moveable on the threaded shaft to adjust the length of the protruded portion and accordingly adjust the binding length.

2. The lever binder of claim 1, further comprising a biased latch mechanism adapted to automatically latch the lever to the first member as the lever is brought into a binding position.

3. The lever binder of claim 2, wherein the binding position is an over center binding position.

4. A lever binder for connecting and tightening loop-type chain lengths used to secure a load onto an open truck bed comprising:
   a lever configured to have a handle portion having offset spaced apart first and second pivot positions;
   a first elongate member having a clevis configuration including an end portion and spaced apart elongate arms extended from said end portion and defining a space between said arms;
   a second elongate member and said first and second members interconnected by their pivotal connections to the first and second pivot positions of said handle;
   said handle and said second member configured to allow handle pivoting from an extended position to a retracted position whereby the second member is folded between the elongate arms of the first member;
   each of said first and second members including coupling members for coupling the opposed ends to spaced apart loops of a loop type chain; and
   said coupling member connected to the end portion of the first member including a threaded shaft protruded through an opening in said end portion, and further including an adjuster located between said arms and threadably engaging said threaded shaft for rotatably adjusting the extent of protrusion of said threaded shaft between said arms to thereby incrementally adjust the retracted length between said couplings.

* * * * *